UNITED STATES PATENT OFFICE.

JOHANN HEINRICH FREY AND ERNST FREY, OF SCHAFFHAUSEN, SWITZERLAND.

PROCESS OF PREPARING NEGATIVES FOR SAND-BLAST ENGRAVING.

No. 903,699.

Specification of Letters Patent.

Patented Nov. 10, 1908.

Application filed September 25, 1907. Serial No. 394,544.

*To all whom it may concern:*

Be it known that we, JOHANN HEINRICH FREY and ERNST FREY, citizens of the Confederation of Switzerland, residing in Schaffhausen, Switzerland, have invented certain new and useful Improvements in Processes of Preparing Negatives for Sand-Blast Engraving, of which the following is a specification.

This invention relates to an improved process by means of which drawings and prints may be transferred to a surface to be engraved by the sand-blast process. The surface to be engraved is covered with a thin film of gelatin sensitive to light, and the object of the invention is to provide a process by means of which drawings and prints are prepared for being heliographically transferred to this film.

It has been found that none of the inks hitherto used for printing or drawing, even the best black ink, is sufficiently opaque for this transferring process. When all such inks produced by known means are used and exposed to electric light the violet and ultra-violet rays penetrate the ink and a sharply defined gelatin relief is not obtainable.

According to the present invention, for the characters or the drawings, so called light-filter inks are employed, *i. e.*, inks which, when applied in a thick layer, have the property of absorbing all chemically active rays. These inks are preferably composed of two parts of glycerin and three parts of gum arabic, completely saturated with an alcoholic solution of a suitable anilin color, such as aurantia or spirituous orange-red, but cannot, however, be used with ordinary transparent tracing papers, as these latter will not absorb the ink. According to the present invention, this difficulty is overcome by using tissue-paper which will absorb the ink to a great depth, without spreading, and which has further properties rendering it suitable for use with the process. As however, tissue-paper is not transparent, it is best made transparent for the present process by grape-sugar. Tissue-paper rendered transparent by grape-sugar and provided with an impression has the useful property that, when applied to the plate in a moist condition and pressed by means of a roller, it adheres in an air-tight manner thereto, a sharp copy consequently resulting.

In order to render the process capable of universal application, it is necessary that from positive drawings or impressions negatives should be capable of being directly produced, and vice versa, so that such prints can be employed instead of the originals. This is effected by the present invention as follows: The drawing or impression is gone over with a light blue gum-printing ink, dusted over with dextrin and dried. After being dried the paper is stretched in a frame. By means of a spraying device an alcoholic solution of shellac, saturated with an anilin color, such as aurantia or spirituous red, is then uniformly applied, this taking but little time, about one-half a minute for 1000 sq. cm. After a lapse of a quarter of an hour the tracing can be developed in ordinary water. As soon as the water has penetrated from the back to the gum and dextrin these substances swell and burst the shellac layer and float off together with the superposed layer of color. At those portions not covered by gum the shellac adheres well and even enters into the tracing paper on Venetian turpentine being added, so that such tracings likewise form light filters. All good transparent commercial tracing papers can be used for making these tracings.

For greater security or strength the tissue-paper impressions and likewise the shellac prints can be treated with bronze while still damp.

The further operation by means of the sand-blast, on the plates, provided with the gelatin relief, is effected in the usual manner, and can be continued so as to effect the engraving to the desired depth.

The resulting engravings are sharper and clearer than those of plates the designs of which have, as hitherto, been transferred mechanically.

Pictures can be transferred by the present process with a great economy of time and labor as compared with previous processes.

Having thus described our invention, we claim as new and desire to secure by Letters Patent:

1. The process of preparing heliographic negatives for sand-blast engraving, which consists in producing a design on transparent paper in anilin ink containing a binding medium.

2. The process of preparing heliographic negatives for sand-blast engraving, which consists in producing an ink design on tissue-paper, and then rendering the tissue-paper transparent.

3. The process of preparing heliographic negatives for sand-blast engraving, which consists in producing an ink design on tissue-paper, rendering such tissue-paper transparent by a solution of grape-sugar, and then rolling the paper while in a moist state onto the surface to be engraved.

4. The process of preparing heliographic negatives for sand-blast engraving, which consists in producing a design on tissue-paper in anilin ink containing a binding medium, rendering such tissue-paper transparent by means of a solution of grape-sugar, and then applying the paper while moist to the surface to be engraved.

5. The process of producing heliographic negatives from positives, and vice versa, consisting in tracing over the design with gum-printing ink, in covering the sheet provided with the design with a water-resisting resinous solution containing opaque anilin coloring matter, and in immersing the sheet in water, whereupon the resinous film is ruptured along the lines corresponding to the contour of the design.

In witness whereof we have hereunto signed our names this 5th day of September, 1907, in the presence of two subscribing witnesses.

JOHANN HEINRICH FREY.
ERNST FREY.

Witnesses:
WILHELM SCHMID,
A. LIEBERKNECHT.